US005752013A

United States Patent [19]
Christensen et al.

[11] Patent Number: 5,752,013
[45] Date of Patent: May 12, 1998

[54] METHOD AND APPARATUS FOR PROVIDING PRECISE FAULT TRACING IN A SUPERSCALAR MICROPROCESSOR

[75] Inventors: Reed K. Christensen, Hillsboro; Andre Eberhard Wolper, Portland, both of Oreg.

[73] Assignee: Intel Corporation, Santa Clara, Calif.

[21] Appl. No.: 85,508

[22] Filed: Jun. 30, 1993

[51] Int. Cl.$^6$ ............................................. G06F 9/38
[52] U.S. Cl. ...................... 395/568; 395/392; 395/800; 395/391
[58] Field of Search ........................... 395/575, 650, 395/375, 500, 733, 800, 388, 390, 392, 393, 568, 591, 183.11; 371/19

[56] References Cited

U.S. PATENT DOCUMENTS

| | | | |
|---|---|---|---|
| 4,295,193 | 10/1981 | Pomerene | 395/391 |
| 4,819,234 | 4/1989 | Huber | 395/183.14 |
| 4,879,676 | 11/1989 | Hansen | 364/748 |
| 5,003,462 | 3/1991 | Blaner et al. | 395/417 |
| 5,109,514 | 4/1992 | Garner et al. | 395/733 |
| 5,134,693 | 7/1992 | Saini | 395/591 |
| 5,214,763 | 5/1993 | Blaner et al. | 395/388 |
| 5,247,628 | 9/1993 | Grohoski | 395/390 |
| 5,440,703 | 8/1995 | Ray et al. | 395/569 |
| 5,461,715 | 10/1995 | Matsuo et al. | 395/388 |
| 5,479,616 | 12/1995 | Ganbay, Jr. et al. | 395/388 |

OTHER PUBLICATIONS

Johnson, "Superscalar Microprocessor Design", Prentice-Hall 1991 pp. 87–88.
Diefendorff et al, "Organization of the Motorola 88110 Superscalar RISC Microprocessor", IEEE Apr. 1992, pp. 40–63.
Moudgill, Mayan, "Precise Interrupts", IEEE Micro, pp. 58–67, Feb. 1996.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A superscalar processor with a precise fault mechanism. Instructions are grouped into a cluster of instructions to be executed simultaneously by the superscalar processor. The cluster is formed from consecutively sequenced instructions according to a predetermined set of grouping rules. If at least one previously executed instruction exists, the consecutively sequenced instructions begin with an initial instruction that is the first instruction following a last previously executed instruction. Each instruction of the cluster is decoded and faulting instructions, if any, of the cluster are determined. Faulting instructions are instructions having an associated trace fault. If no faulting instructions were found, each instruction in the cluster is executed simultaneously. If, however, at least one faulting instruction was found, a break faulting instruction is determined. The break faulting instruction is the first faulting instruction in the consecutive sequence of the cluster instructions. The break faulting instruction and each instruction of the cluster in the consecutive instruction sequence prior to the break faulting instruction are then simultaneously executed.

30 Claims, 11 Drawing Sheets

|     | $t_1$ | $t_2$ | $t_3$ | $t_4$ |
|-----|-------|-------|-------|-------|
|     | FETCH U-I1  311 | DECODE U-I1  321 | EXECUTE U-I1  331 |       |
|     | FETCH U-I2  312 | DECODE U-I2  322 | EXECUTE U-I2  332 |       |
|     | FETCH U-I3  313 | DECODE U-I3  323 | EXECUTE U-I3  333 |       |
|     |       | FETCH U-I4  324 | DECODE U-I4  334 | EXECUTE U-I4  344 |
|     |       | FETCH U-I5  325 | DECODE U-I5  335 | EXECUTE U-I5  345 |
|     |       | FETCH U-I6  326 | DECODE U-I6  336 | EXECUTE U-I6  346 |

*Figure 3*

TRACE CONTROL REGISTERS 400

| | |
|---|---|
| TRACE ENABLE | 405 |
| TRACE FAULT PENDING | 410 |
| INSTRUCTION MODE | 415 |
| BRANCH MODE | 417 |
| CALL MODE | 420 |
| RETURN MODE | 422 |
| PRE RETURN MODE | 425 |
| SUPERVISOR MODE | 427 |
| MARK / FMARK MODE | 430 |
| INSTRUCTION EVENT | 432 |
| BRANCH EVENT | 435 |
| CALL EVENT | 437 |
| RETURN EVENT | 440 |
| PRE RETURN EVENT | 442 |
| SUPERVISOR EVENT | 445 |
| MARK / FMARK EVENT | 447 |
| IP BRKPT 0 | 450 |
| IP BRKPT 1 | 455 |
| TLB DA BRKPT EVENT | 460 |
| XLAT FLT IP | 465 |
| SEL MEM 1 | 470 |
| CONST | 475 |
| SERIAL BRANCH | 480 |
| BRANCH READY | 485 |
| REG IPBP 0 | 490 |
| REG IPBP 1 | 495 |

*Figure 4*

METHOD AND APPARATUS FOR PROVIDING PRECISE FAULT TRACING IN A SUPERSCALAR MICROPROCESSOR

BACKGROUND OF THE INVENTION

1. Field of the Invention

The present invention relates to the field of testing and debugging computer systems, in particular, superscalar microprocessor based computer systems. More specifically, the present invention relates to testing and debugging using in-circuit emulation or a software debugger.

2. Art Background

Microprocessor based computer systems are well known and widely available. Generally, the heart of a microprocessor system is a single integrated circuit (IC) chip that contains a processor. Typically, after going through a bootstrap initialization process, the processor reads, decodes and executes a stream of instructions that together form a program or process. Usually, the process is stored external to the processor chip in random access memory (RAM) or in read only memory (ROM).

Prototype hardware and system software for a microprocessor system are often tested and debugged using a secondary auxiliary processor (host system), that monitors and controls the prototype system under test (target system). The host system is also known as an in-circuit emulator or development system. Additionally, if the operating software of the target system is not functional enough to permit a local debugger to execute on the target system, testing and debugging are performed using a remote debugger on the host system.

In order for the host system to be able to monitor and control the target system, the host system must be able to stop the target system, inspect or modify the processor and system states, and then allow the target system to resume normal operation. More specifically, the host system typically will be able to:

a) stop the processor of the target system, b) inspect the registers and memory locations of the target system to determine the state of the target system, c) provide a command or instruction to the processor of the target system for execution, d) modify the registers and memory locations of the target system, e) alter the program counters of the target system to resume program execution on the target system at a different location than the location the target system relinquished control to the host system, and f) cause the target system to resume normal operation.

Traditionally, additional pins are provided to the pin-out of the processor chip or a special version of the processor chip of the target system, to allow the host system to be connected to the target system and to perform the monitor and control functions described above. The host system stops the target system by asserting a break signal on one or more of the additional pins of the processor chip. Upon receiving the break signal, the processor chip generally completes the instruction that is currently executing and then stops and awaits further instructions from the host system. The host system can then set break points that cause the target system to halt and return control to the host system when certain conditions occur. Examples of common break points that may be set include break points that occur when a particular instruction is executed and break points that occur when a particular memory address is accessed.

A function similar to in-circuit emulation is also performed by a software debugger. In the case of the software debugger, there is no need for a host system. Instead, a software debugging program that is similar to any other user program is typically stored on a random access device such as a hard drive in the same way that a user program would be stored. Typically, the software debugger is executed and a user program to be debugged is specified. The software debugger then controls the execution of the user program to be executed. In this way, the software debugger permits a user to stop the target system, inspect or modify the processor and system states, and then allow the target system to resume normal operation. Thus, a user can employ a software debugger to perform the same functions of in-circuit emulation directly from the host system.

In a single scalar processor, instructions are read, decoded and executed sequentially on a one-instruction-at-a-time basis. Because only one instruction is being executed at a time, if a break point is encountered, it is relatively straight forward to interrupt the execution immediately after executing the instruction containing the break point. The ability to stop execution precisely upon encountering a break point is called a precise fault mechanism.

In a superscalar processor, however, groups or clusters of instructions are read, decoded and executed simultaneously. Therefore, in a superscalar processor, it is possible to have one or more breaks set on one or more instructions that are executing concurrently. Superscalar processors typically have imprecise fault mechanisms whereby, in an instruction cluster that contains a break point, execution is stopped after execution of the last instruction of the cluster. An imprecise fault mechanism does not afford the ability to stop execution precisely after executing the first instruction in the cluster to have a break point.

SUMMARY OF THE INVENTION

A method and apparatus for providing precise trace faults in a superscalar processor is described. Instructions are grouped into a cluster of instructions to be executed simultaneously by the superscalar processor. The cluster is formed from consecutively sequenced instructions according to a predetermined set of grouping rules. If at least one previously executed instruction exists, the consecutively sequenced instructions begin with an initial instruction that is the first instruction following a last previously executed instruction.

Each instruction of the cluster is decoded and faulting instructions, if any, of the cluster are determined. Faulting instructions are instructions having an associated trace fault.

If no faulting instructions were found, each instruction in the cluster is executed simultaneously. If, however, at least one faulting instruction was found, a break faulting instruction is determined. The break faulting instruction is the first faulting instruction in the consecutive sequence of the cluster instructions. The break faulting instruction, and each instruction of the cluster in the consecutive instruction sequence prior to the break faulting instruction, are then simultaneously executed.

BRIEF DESCRIPTION OF THE DRAWINGS

The objects, features, and advantages of the method and apparatus of the present invention will be apparent from the following detailed description of the invention in which:

FIG. 3 illustrates the flow of two instruction clusters through a three instruction deep superscalar microprocessor;

FIG. 4 illustrates trace control registers used by one embodiment of a precise fault handler for a superscalar microprocessor;

DETAILED DESCRIPTION OF THE INVENTION

A method and apparatus for implementation of a precise fault mechanism for superscalar processor architectures is disclosed. The method and apparatus disclosed has particular application to testing and debugging of superscalar microprocessor based computer systems.

In the following description, for purposes of explanation, specific numbers, materials and configurations are set forth in order to provide a through understanding of the present invention. It will be apparent to one skilled in the art, however, that the present invention may be practiced without these specific details. In other instances, well known systems are shown in diagrammatic or block diagram form in order not to obscure the present invention unnecessarily.

Figure 1:
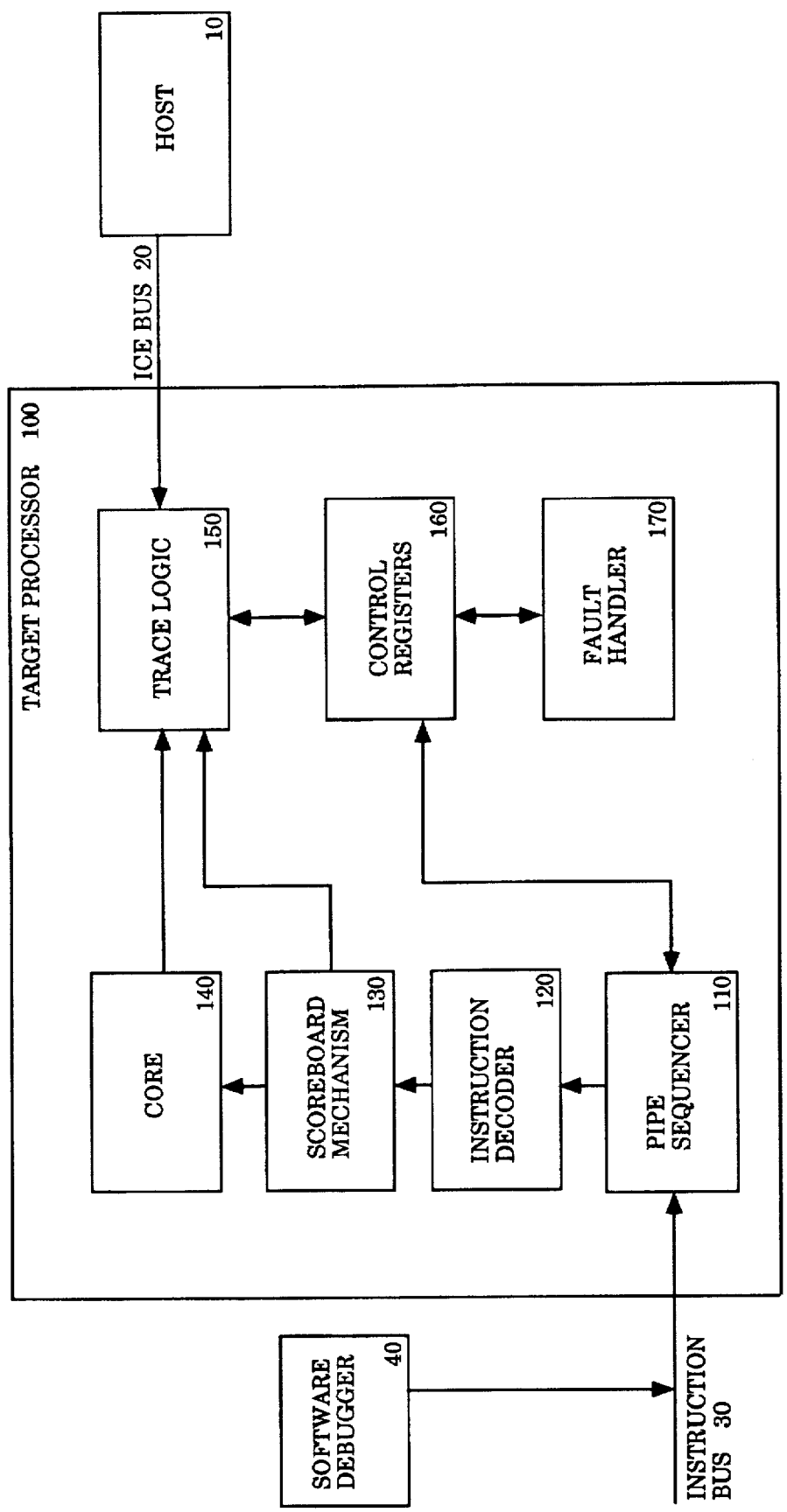
FIG. 1 illustrates a precise trace fault mechanism in a superscalar microprocessor based computer system coupled to an external in-circuit emulator processor.

Referring now to FIG. 1, a superscalar microprocessor based target system is shown coupled to a host system so that in-circuit emulation (ICE) can be performed. In FIG. 1, external in-circuit emulator 10 (the host system) is coupled to target processor 100 by in-circuit emulation bus 20. External in-circuit emulator 10 can be a general purpose computer such as a personal computer. Alternately, external in-circuit emulator 10 can be a dedicated processor developed specifically for providing in-circuit emulation.

The heart of target processor 100 is core 140. Core 140 is where code is executed. Because target processor 100 is a superscalar processor, multiple instructions can be executed in core 140 simultaneously.

Instructions to be executed by target processor 100 enter pipe sequencer 110 through instruction bus 30. Pipe sequencer 110 groups the instructions to be executed into clusters of consecutive instructions that are to be executed at the same time by the superscalar processor. Each instruction in a group of instructions is then decoded by instruction decoder 120. Scoreboard mechanism 130 then checks the decoded instructions of an instruction group to determine whether any break points have been set on any of the instructions in the instruction group. If one or more break points are detected by scoreboard mechanism 130, scoreboard mechanism 130 will notify trace logic 150 that the break point, or break points, have been encountered in the instruction cluster. At the same time, scoreboard mechanism 130 will pass to core 140 only those instructions of the instruction group that do not appear after the first break point of the instruction group and hence are to be executed.

Trace logic 150 provides an interface between host system 10 and target processor 100. It is through trace logic 150 that host system 10 stops the execution of user code by target processor 100 to set break points. It is also through trace logic 150 that host system 10 is notified when a break point has been encountered.

Control registers 160 are used by trace logic 150 to keep track of breaks that have been set by the host system and breaks that have occurred during execution of an instruction group by core 140. When a break is encountered, fault handler 170 executes a serialization algorithm that is used to determine which, if any, of the instructions in an instruction group have been executed, and which, if any, of the instructions have not.

Alternately, trace logic 150 can be used by software debugger 40 to debug software in much the same manner as would be performed by the host system using in-circuit emulation. When a break set by software debugger 40 is detected by trace logic 150, the serialization algorithm would be performed by fault handler, 170. Then, instead of turning control of target processor 100 over to host system 10, code instructions from software debugger 40 would be executed by core 140 until software debugger 40 ordered target processor 100 to continue execution of the software being debugged.

Just as host 10 can be used in a system that does not have software debugger 40, software debugger 40 can be used in a system that does not include host 10. It is also possible to use host system 10 and software debugger 40 in the same system. The latter case could be accomplished, for example, by having trace logic 150, upon detecting a trace fault, test a value, settable by host 10 and software debugger 40, and stored in control registers 160 to determine whether to turn control of processor 100 over to host 10 or software debugger 40.

Figure 2:
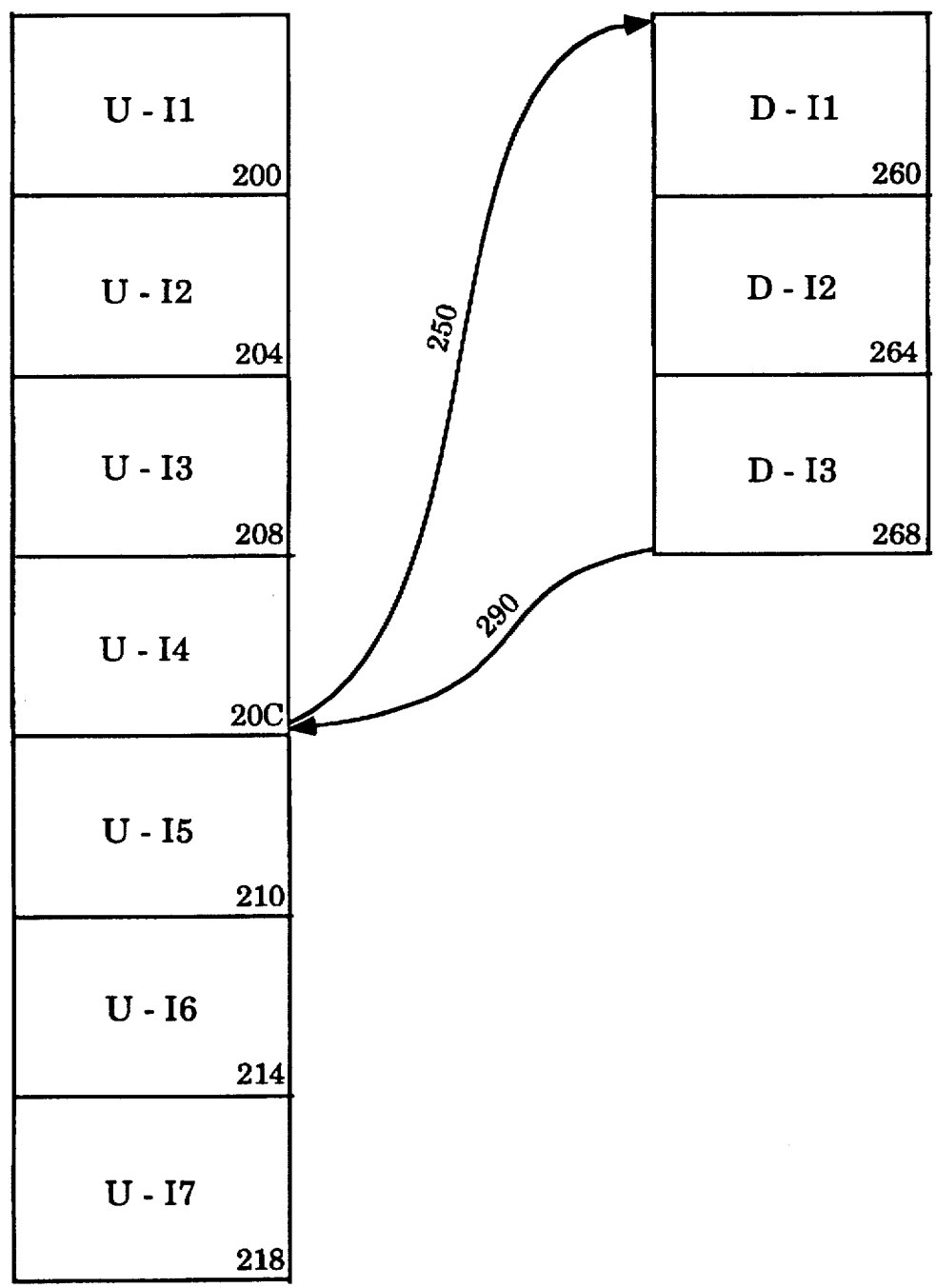
FIG. 2 illustrates a break to a fault handler with a subsequent return.

Referring now to FIG. 2, a break to in-circuit emulation and return therefrom is illustrated. In FIG. 2, a contiguous region of memory containing seven user code instructions (U-I1 to U-I7) of a process are depicted as being stored in memory locations 200–218.

In a single scalar processor, user instructions U-I1 through U-I7 would be fetched, decoded and then executed sequentially. If the processor is pipelined, a first instruction (e.g. U-I1) would be executing while a second instruction (e.g. U-I2) is being decoded and a third instruction (e.g. U-I3) is being fetched. Typically, an instruction pointer is maintained by the processor to keep track of the memory address containing the instruction that is currently being executed.

Therefore, if the user instruction sequence of FIG. 2 were being executed by a pipelined single scalar microprocessor, the instruction pointer would point to memory location 208 when user instruction U-I3 was being executed. At that time, user instruction U-I4 would be in the process of being decoded to prepare it for execution and user instruction U-I5 would be in the process of being read so that it could be decoded.

In FIG. 2, a breakpoint is set on user instruction U-I4 at memory location 20C. Thus, upon executing user instruction U-I4, the pipeline is to be broken by the fault handler before user instruction U-I5 is executed. As depicted by arrow 250, processing then continues from U-I4 to a fault handling debugger program stored in a separate area of memory. In this example, the debugger program is comprised of three instructions (D-I1 through D-I3), that are stored in memory locations 260–268, respectively.

The debugger code permits the host system or software debugger to take control of the processor and thereby examine and modify processor state. When the host system or software debugger returns control to the processor, the debugger code completes execution and returns control to the microprocessor so that it may continue execution of the user instruction code sequence (arrow 290) where it left off at user instruction U-I5.

On the other hand, the user code instruction sequence of FIG. 2 can be executed by a superscalar processor. In an example case where the processor is able to read, decode and execute three instructions at a time, user instructions U-I1 through U-I3 would be decoded at the same time user instructions U-I4 through U-I6 were being fetched. In the next clock cycle, user instructions U-I1 through U-I3 would be executed simultaneously while user instructions U-I4 through U-I6 were being decoded. When it came time for user instructions U-I4 through U-I6 to be executed, the break on user instruction U-I4 would be detected by a fault mechanism. If the microprocessor had an imprecise fault mechanism, user instructions U-I4 through U-I6 would be executed before control was transferred to the fault handling routine.

Ideally, if the processor has a precise fault mechanism, rather than executing code instructions U-I4 through U-I6, the processor would execute code instruction U-I4 but not execute U-I5 or U-I6. Control would then be passed to the fault handler and host system where the in-circuit emulation could be performed or to the software debugger where software debugging could be performed. Upon completion of the in-circuit emulation or software debugging, control would return to the processor and the processor would then execute code steps U-I5 and U-I6.

Referring now to FIG. 3, a diagram illustrating the superscalar microprocessor is depicted. In FIG. 3, it can be seen that at time $t_1$, user instructions U-I1 through U-I3 are being fetched. At time $t_2$, user instructions U-I1 through U-I3 are being decoded while user instructions U-I4 through U-I6 are being fetched. Then, at time $t_3$, user instructions U-I1 through U-I3 are being executed while user instructions U-I4 through U-I6 are being decoded. Finally, at time $t_4$, user instructions U-I4 through U-I6 are being executed.

As will be explained below in greater detail, a trace fault can be detected during the decode stage. Therefore, a scoreboard mechanism can be implemented that blocks execution of any instructions in an instruction group subsequent to the first instruction in the instruction group to have a break set. Thus, if a break were discovered during the decoding of user instruction U-I4 at time $t_3$, a scoreboard mechanism could block execution of user instructions U-I5 and U-I6 at time $t_4$.

The implementation of a precise fault mechanism for a superscalar processor is instruction set and architecture specific. This is because a particular superscalar architecture will define how many, and what type of instructions can be executed simultaneously. Basically, however, a precise fault mechanism for a superscalar processor will have three components. These components are an issue template, a scoreboard mechanism and a fault handler.

Referring again briefly to FIG. 1, the issue template is generated by pipe sequencer 110 when a particular instruction group is formed. If the architecture of the superscalar microprocessor is such that the superscalar processor will always execute the maximum number of instructions during every clock cycle, an issue template will not be required. Frequently, however, the superscalar architecture has limitations as to the number and type of instructions that may be grouped together. Moreover, even without these limitations, it is sometimes desirable to force a superscalar processor into a single-scalar mode. Thus, the pipe sequencer will group from one to the maximum number of instructions per group into an instruction cluster that is suitable for the given architecture to execute simultaneously. The issue template, then, is the information that describes the number and type of instructions grouped in a particular instruction cluster.

It is possible to implement a precise fault scheme in a superscalar processor by forcing the superscalar processor into a single-scalar mode whenever in-circuit emulation of software debugging is to be performed. This scheme, while satisfactory for some purposes, is not always satisfactory. This is because the instructions are not grouped together in the single-scalar mode, and hence, execute differently than when in the superscalar mode. Therefore, problems, such as timing problems, that occur in the superscalar mode will not be observable in the single-scalar mode.

As described above, the scoreboard mechanism 130 is used to block execution of any instructions in an instruction cluster that are subsequent to the first instruction in the instruction cluster that has a break point attached to it. Thus, an output of the scoreboard mechanism to trace logic 150 is information that a break was encountered in a particular instruction group, and also information as to which of the instructions were blocked from execution by the scoreboard mechanism.

When the trace logic 150 is notified by the scoreboard mechanism 130 that a break point has been encountered, fault handler 170 is invoked by the trace logic 150. Fault handler 170 then uses the information provided by the pipe sequencer 110 and scoreboard mechanism 130 to ensure that any instructions in the faulting instruction group that were not executed prior to the break will be executed upon return from debugging.

Control registers 160 are used by the pipe sequencer 110, scoreboard mechanism 130, trace logic 150 and host 10 to control tracing and keep track of trace faults as they occur. Thus, fault handler 170 can use the information stored in control registers 160 to provide a precise fault mechanism.

Referring now to FIG. 4, trace control registers of one embodiment of a precise fault mechanism for a superscalar processor are depicted. In FIG. 4, all of the registers are single bit registers with the exception of registers XLAT FLT IP 465, REG IPBP 0 490, and REG IPBP 1 495. Register XLAT FLT IP 465 is used by the fault handler to calculate the instruction pointer locations for each instruction in a faulting instruction group. Register IPBP 0 490 is used to store an instruction pointer memory address upon which an instruction pointer break has been set. If a second instruction pointer break is set, then the instruction pointer memory address for the second instruction pointer break point is stored in register IPBP 1 495.

Trace enable bit 405 is set by the host system or software debugger. When trace enable bit 405 is set, the trace fault mechanism will operate. If there is no need for in-circuit emulation, the trace enable bit 405 will not be set and the trace fault mechanism will be disabled.

Trace fault pending bit 410 is set by the trace logic when a trace fault is encountered. Setting of the trace fault pending bit 410 invokes fault handler 170 to handle the pending trace fault.

Instruction, branch, call, return, pre-return, supervisor and mark/fmark mode bits 415, 417, 420, 422, 425, 427 and 430, respectively, are set by the host processor or software debugger and control the mode of the trace fault mechanism. If instruction mode bit 415 is set, the superscalar capability of the target processor is disabled and only one instruction is executed at a time. After each instruction is executed, instruction event bit 32 will be set thereby notifying trace fault handler 170 that the instruction has executed. If tracing is enabled and the branch mode bit 417 is set, branch event bit 435 will be set and a trace fault break will occur whenever a branch instruction is executed. Similarly, whenever tracing is enabled and call mode bit 420 is set, call event bit 437 will be set and a trace fault break will occur whenever a call instruction is encountered. If tracing is enabled and return mode bit 422 is set, return event bit 440 will be set and a trace fault break will occur whenever a return from a called routine has occurred. If tracing is enabled and pre-return mode bit 425 is set, pre-return event bit 442 will be set and a trace fault break will occur prior to a return from a called routine. If tracing is enabled and supervisor mode bit 427 is set, supervisor event bit 447 will be set and a trace fault break will occur whenever the process enters the supervisor mode during an execution environment change. A mark/fmark event occurs when a user instruction has an explicit invocation of the trace fault handler. If tracing is enabled and mark/fmark mode bit 430 is set, mark/fmark event bit 447 will be set and a trace fault break will occur whenever a mark/fmark has occurred. If tracing is enabled and an instruction pointer memory address has been stored in register IPBP 0 490, event bit IP BKRKPT 0 450 will be set and a trace fault break will occur whenever the instruction stored at the instruction pointer memory address stored in register register IPBP 0 490 has been executed. Similarly, if tracing is enabled and an instruction pointer memory address has been stored in register IPBP 1 495, event bit IP BKRKPT 1 455 will be set and a trace fault break will occur whenever the instruction stored at the instruction pointer memory address stored in register register IPBP 1 495 has been executed. Finally, the TLB DA break point event flag 460 is set when the translation look-aside buffer discovers that a data break point was set for a data location that is being accessed.

Register bits SEL MEM1 470, const 475, serial branch 480 and branch ready 485 contain the information of the issue template of the superscalar processor. In this architecture, up to three instructions can be executed in parallel. The instructions are separated into three types: REG, MEM, and BOP. REG instructions are register-to-register instructions such as adds, subtracts, or moves. MEM instructions are load and store types of instructions. BOPs are branch operations. Table 1 sets forth the possible issue templates and corresponding values of the SEL MEM1, const, serial branch and branch ready bits for the embodiment being described. It is possible for a MEM type instruction to be two words long. In Table 1, MEM designates the first word of the MEM type instruction and DIS signifies the second word.

It can also be seen from Table 1 that no instruction cluster can contain more than one instruction of a given type. Furthermore, if an instruction contains a REG type instruction, it must be the first instruction in the cluster. Also, if an instruction in cluster contains a BOP type instruction, it must be the last instruction in the cluster.

TABLE 1

| SEL MEM1 | CONST | SERIAL BRANCH | BRANCH READY | INSTRUCTIONS ISSUED W0 | W1 | W2 |
| --- | --- | --- | --- | --- | --- | --- |
| — | — | 1 | 1 | BOP | | |
| 0 | 0 | 0 | 0 | REG | | |
| 0 | 0 | 0 | 0 | MEM | | |
| 0 | 0 | 0 | 0 | MEM | DIS | |
| 0 | 1 | 0 | 0 | MEM | DIS | |
| 0 | 0 | 0 | 1 | REG | BOP | |
| 1 | 0 | 0 | 0 | REG | MEM | |
| 1 | 0 | 0 | 0 | REG | MEM | DIS |
| 0 | 0 | 0 | 1 | MEM | BOP | |
| 0 | 1 | 0 | 1 | MEM | DIS | BOP |
| 1 | 0 | 0 | 1 | REG | MEM | BOP |

From Table 1 it can be seen that the serial branch 480 bit is only set when a branch operation, and no other operation, is issued in an instruction group. If an instruction group includes a branch operation, the branch ready 485 bit is set. If an instruction group includes both a register and a memory instruction, then the SEL MEM1 bit 470 is set. Finally, the const bit 475 is set when the issue template includes a double word memory instruction, but does not also include a register instruction.

Figure 5:
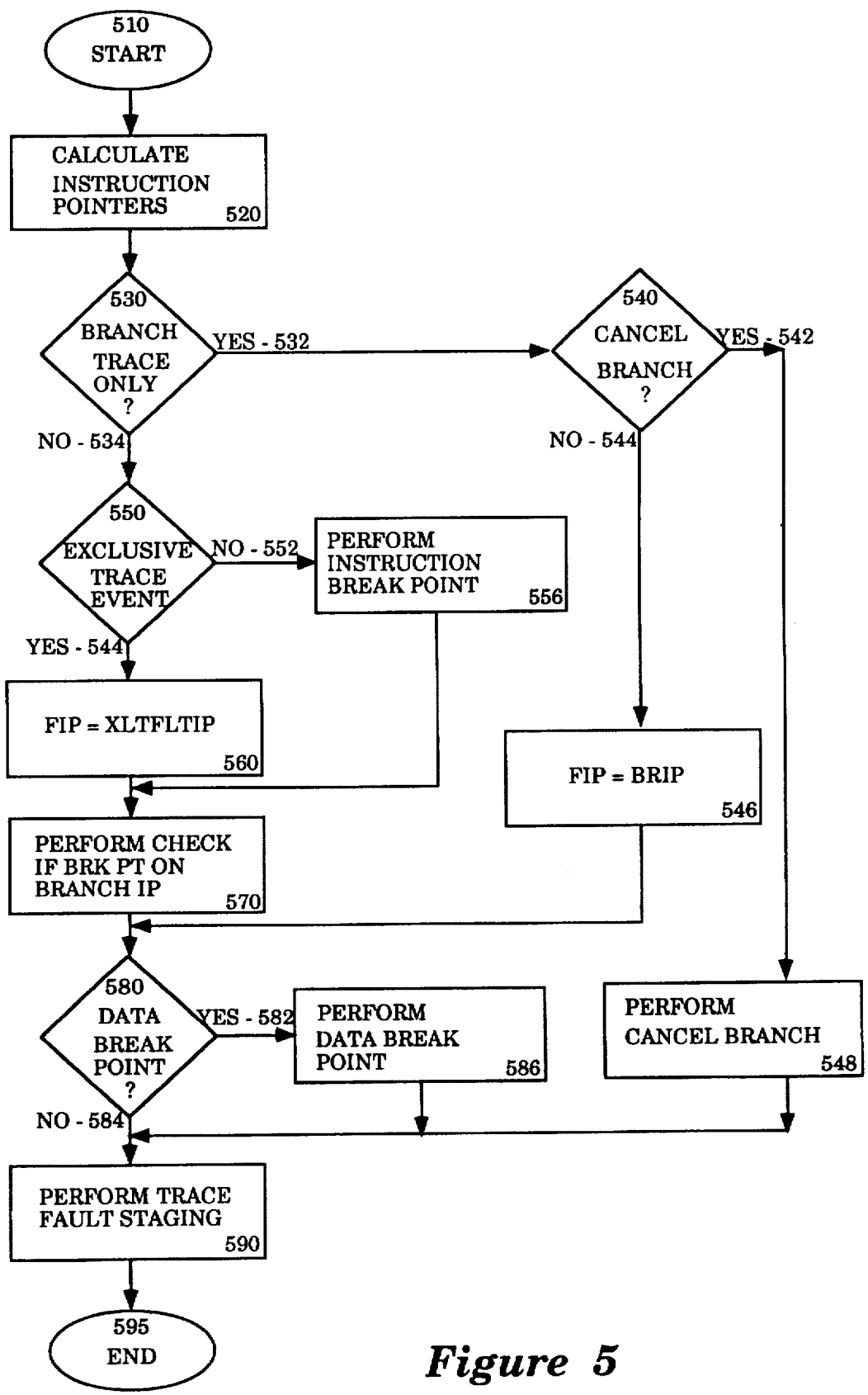
FIG. 5 illustrates a serialization algorithm used by one embodiment of a precise fault mechanism for a superscalar processor.

Referring now to FIG. 5, a serialization algorithm for one embodiment of a precise fault mechanism for a superscalar processor is illustrated. Serialization algorithm 500 of FIG. 5 would be executed by fault handler 170 of FIG. 1 upon the occurrence of a fault. In FIG. 5, serialization algorithm 500 begins at initialization block 510 when the fault pending bit of the trace control register is set by the trace logic thereby indicating that a break to the trace handler is required. Serialization algorithm 500 uses the values of the trace control register to determine which instructions were part of the instruction group that encountered the trace fault, or faults, and which of those instructions were blocked by the scoreboard mechanism because they followed the first instruction in the group that had a break associated with it. Serialization algorithm 500 then makes any adjustments necessary to ensure that execution will commence with the instruction immediately following the first instruction of the instruction group to have a break point.

In process block 520 the instruction pointers are calculated for each of the instructions in the faulting instruction group. Register XLAT FLT IP contains the instruction pointer address of the first instruction in an instruction group. Table 2, shown below, indicates the adjustments that must be made to the address in XLAT FLT IP to calculate the IP addresses for each instruction in a given issue template. Thus, for example, if the instruction template is comprised of a single branch operation, no adjustment will be required to XLAT FLT IP. The branch instruction pointer will simply be the value stored in XLAT FLT IP. Because the issue template does not include memory or register instructions, there will be no need to calculate memory or register instruction pointer values. On the other hand, in the case where the instruction template is that of a register, memory and branch operation, the register instruction pointer will equal the value in the XLAT FLT IP register, the memory operation instruction pointer (IP) will have a value four more than that of the register operation IP and the branch operation instruction pointer will have a value eight more than that of the register operation IP.

TABLE 2

| INSTRUCTION ISSUE | | | ADJUSTMENT REQUIRED | | |
|---|---|---|---|---|---|
| | | | BRIP | MEM IP | REG IP |
| BOP | | | None | N/A | N/A |
| REG | | | N/A | N/A | None |
| MEM | | | N/A | None | N/A |
| MEM | DIS | | N/A | None | N/A |
| REG | BOP | | Add4 | N/A | None |
| REG | MEM | | N/A | Add4 | None |
| REG | MEM | DIS | N/A | Add4 | None |
| MEM | BOP | | Add4 | None | N/A |
| MEM | DIS | BOP | Add8 | None | N/A |
| REG | MEM | BOP | Add8 | Add4 | None |

Figure 6:
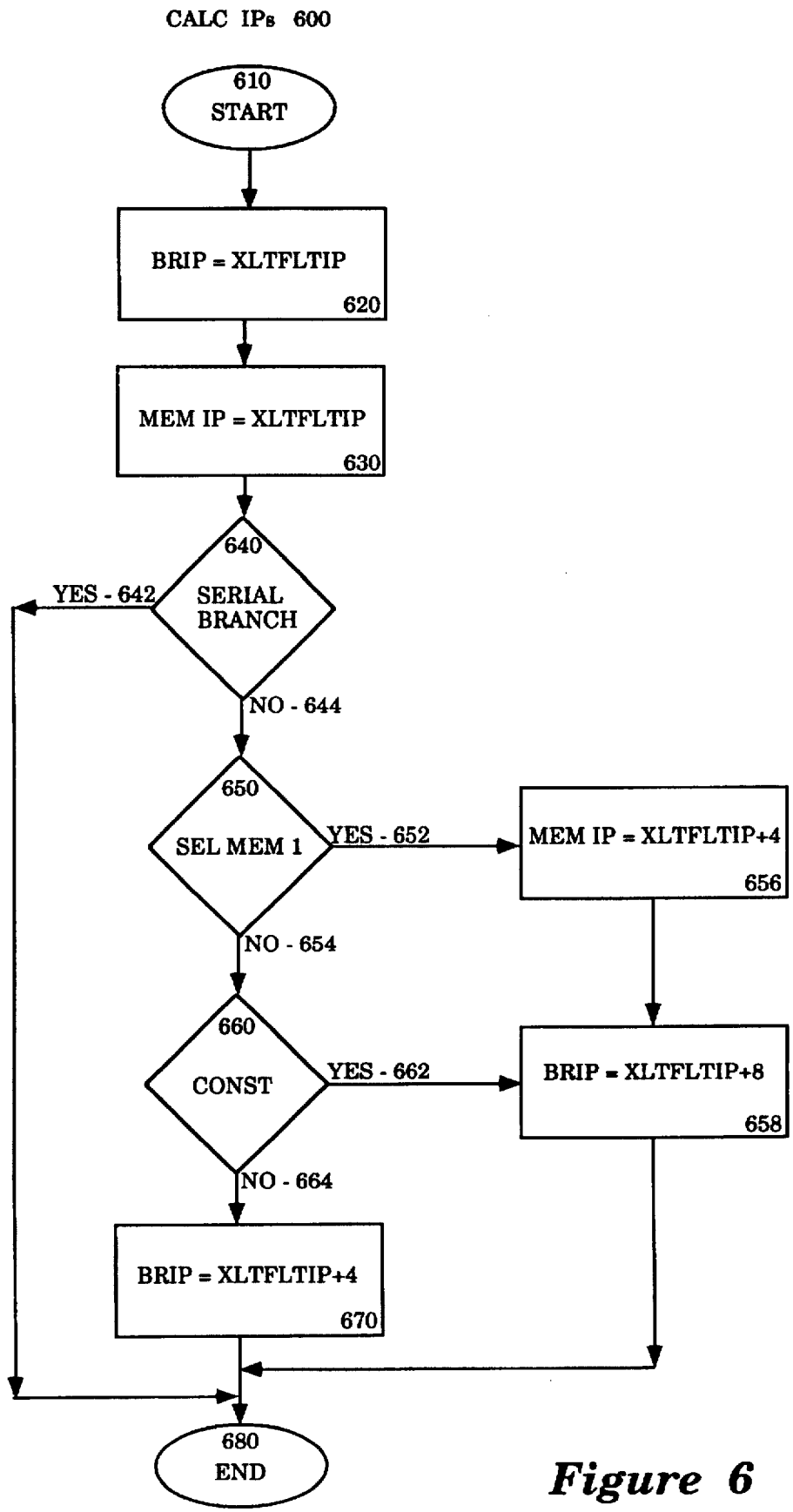
FIG. 6 illustrates a flow chart depicting the way instruction pointers can be calculated for use in the serialization algorithm of FIG. 5.

Referring briefly to FIG. 6, an expanded flow chart of process block 520 of FIG. 5 is depicted to show the calculation of the instruction pointers for a given issue template. In FIG. 6, processing starts at process block 610 and continues to process block 620 where the branch operation IP is set to the value stored in XLT FLT IP. Similarly, in process block 630, the MEM operation IP is set to the XLT FLT IP value. In decision block 640, a test is made to see whether the serial branch bit is set to indicate that the instruction template is comprised only of a single branch operation. If the serial branch bit is set, decision path 462 is taken to terminal block 680 where the CALC IPS routine 600 terminates. If, on the other hand, the serial branch bit is not set, decision path 644 is taken to decision block 650 where a test is made to determine whether flag SEL MEM1 is set. If SEL MEM1 has been set, then that means that the second instruction in the instruction group is a memory instruction and the memory instruction pointer must be adjusted accordingly. Thus, decision path 652 is taken to process block 656 where the memory instruction pointer is set to the XLT FLT IP value plus four, processing then continues to process block 658 to handle the case where the third instruction is a branch operation. In that case, the branch instruction pointer is set to the XLT FLT IP value plus eight before the routine terminates at bubble 680.

Referring again to decision block 650, if the SEL MEM1 bit was not set, processing continues along decision path 654 to decision block 660 where a test is performed to see whether the const bit has been set. If the const bit has been set, then decision path 662 is taken to process block 658 where the branch operation IP is set to the XLT FLT IP value plus eight before the routine terminates at bubble 680. If, on the other hand, the const bit was not set, decision path 654 is taken from decision block 660 to process block 670 where the branch operation IP is set to XLT FLT IP value plus four.

Referring again to FIG. 5, once the instruction pointers have been calculated in process block 520, serialization algorithm 500 determines the first instruction in a group of instructions that has a trace fault. If this instruction is not the last instruction of the instruction group, and there is more than one instruction in the instruction group, serialization algorithm 500 adjusts the return instruction pointer to ensure that any instructions occurring after the faulting instruction will be executed upon return from the trace fault handler.

Serialization algorithm 500 is aided by rules that govern the issue template of groups of instructions sequenced by the pipe sequencer, and by rules that govern the operation of the scoreboard mechanism. These rules are instruction set and superscalar architecture specific. The following, are rules used by the embodiment of the precise fault mechanism that has the issue template set described by Table 1 above. In this embodiment, multiple trace faults can occur during instruction issue and execution. This may be because a single instruction has more than one trace fault, or because multiple instructions were issued, each with a trace fault. Multiple trace faults on a single instruction can be handled in a straight forward way because they appear almost as a single trace fault, except that the trace word subtype indicates more than one trace fault. In the embodiment being described, the following trace faults can only occur due to micro coded operations, or when the machine is in a single step (no parallel execution) mode. For the following trace faults, if multiple trace faults exist, it must be the case of a single instruction with more than one trace fault. The instructions that have trace faults occurring alone include: call trace event instructions (e.g. implicit calls), return trace event instructions (i.e. instructions that occur upon return from a called subroutine), pre-return trace event instructions (i.e. instructions that occur prior to initiating a return to a calling subroutine), subsystem/supervisor trace event instructions, break point trace event instructions (i.e. software breaks such as Mark and Fmark) and instruction trace events (i.e. instructions that occur when the processor has been placed in a single-step execution mode so that no parallel instruction execution is permitted).

Because the embodiment being described is a superscalar processor, execution in a single clock of multiple instructions, each with a trace fault, can happen. This can occur when the superscalar processor tries to issue two or three instructions in a single clock. In this embodiment, a fault record can only report a single instruction pointer, therefore the architecture cannot handle parallel trace faults and the occurrence of these must be serialized into serial trace faults. In the embodiment being described, only the following type of trace faults can occur simultaneously due to different instructions, in the same instruction issue: branch trace events, instruction break point trace events (i.e. hardware break points placed on the instruction pointer), and data break point trace events (i.e. hardware break points placed on a data address).

These trace faults are to be precise faults and therefore are reported as a single fault to the user and cause the execution of the machine to stop exactly after (pre-return trace faults: before) the faulting instruction and initiate an implicit call to the trace fault handler. Upon returning, the trace fault handler then returns the next instruction to be executed. Referring again to Table 1, it can be seen that the maximum number of instructions that can be issued in parallel is three, and the issuance abides one of the patterns described in Table 1. Trace faults can occur on every one of the one through three instructions issued simultaneously. Faults other than trace faults can also be present on either the register or memory operations. The scoreboard mechanism keeps certain trace fault combinations from occurring according to two rules that are specific to the embodiment being described.

The first rule is that trace faults on a register instruction in a multiple instruction issue set cannot have any other faults in the instructions following the register instruction except for a possible trace fault on the branch operation if there is one. This is because, if the trace fault is due to a register instruction in the set, the scoreboard mechanism will cancel the subsequent memory instruction execution thus insuring that there are no other faults due to the memory operation. Because this embodiment performs branch lookahead, however, a possible trace on the branch operation could occur.

Thus, given a first example of a three instruction cluster comprising a register instruction followed by a memory instruction and then a branch operation. If there is a trace fault and a non-trace fault occurring both on the register and memory instructions, the first rule simplifies determination of the fault occurrence. This is because, in this example, the memory operation will be canceled by the scoreboard because of the trace fault on the register operation. Hence, when the fault assist invokes, the register operation will have executed, but the memory operation will not. Therefore, from a fault recording point of view, the scoreboard mechanism has reduced the example to the simple case of a register operation that has a trace fault and a non-trace fault associated with it. From rule one it follows that a trace fault and a non-trace fault occurring together must be on the same instruction. The fault handler would handle the non-trace fault first, with the trace fault saved on a resumption record. On return from the non-trace fault handler, the trace fault handler would be invoked to handle the trace fault on the instruction.

Because the example also contains a branch operation, the serialization algorithm must also account for the branch operation. This is because in the above example the saved instruction pointer and the fault return instruction pointer would point to the target of the branch. Thus, the trace fault return instruction pointer is adjusted to be that of the memory instruction that needs to be reissued. Subsequent re-execution of the branch operation does not hurt anything because branch operations do not change the state of the processor. Finally, if a trace fault had occurred on the branch operation, it would also be necessary to clear that out.

A second rule of the scoreboard mechanism is that trace faults on a memory instruction in a multiple instruction issue set cannot have any other faults but a trace fault on the branch operation following the memory instruction. This is because if a trace fault occurs on a memory operation, no other non-trace fault can follow because branch operations can only cause trace faults. Thus, in a second example, an instruction sequence comprising a register operation followed by a memory operation followed by a branch operation where a trace fault and non-trace fault occur on the memory operation and non-trace fault also occurs on the branch operation cannot occur. This is because the only fault that a branch operation can cause is a trace fault or an invalid operation code. Invalid operation code faults, however, cause the branch operation to not be recognized and thus they are deferred until the next issue cycle. Thus, the second example reduces to a register instruction followed by memory instruction where the memory instruction has the two faults occurring on it. In this case, the fault handler for the non-trace fault would be called to handle the non-trace fault on the memory instruction. Then, a call to the trace fault handler would occur. Note that this is consistent with the previous conclusion that a trace fault and a non-trace fault reported together must have happened on the same instruction.

A third example of fault handling will occur when a register, memory and branch operation are grouped together. In this third example, a trace fault and non-trace fault both occur on the memory instruction and a trace fault also incurs on the branch operation. This situation is handled similarly to the way it was handled in the first example. The fault return instruction pointer is adjusted to be the instruction pointer of the branch operation, and the trace fault on the branch operation is cleared. The branch operation trace fault will regenerate later when the branch operation is re-executed. This solution may be used because branch operations do not modify state, and thus re-executing them upon return from the fault handler does no harm.

Referring again to FIG. 5, it can be seen that serialization algorithm 500 applies the first and second rules (and the observation that only branch trace, instruction break points and data break points can occur during a parallel instruction issue) to serialize trace faults. After calculating the instruction pointers in process block 520, a test is made in decision block 530 to determine whether the only trace fault being reported is a branch trace. If that is the case, then decision path 532 is taken to decision block 540 where a test is made to determine whether the branch operation must be canceled. In decision block 540, there are two trace fault patterns that require canceling of the branch trace and resetting of the fault return instruction pointer to point to the branch instruction itself (instead of the branch target, where it is currently pointing). These two situations occur when there is a register and branch operation or a memory and branch operation. In both cases, the trace fault occurs on the branch operation and a non-trace fault occurs on the non-branch operation. These two situations can be detected because they occur when there is a parallel issue, there is a branch operation, the fault instruction pointer is not equal to the branch instruction pointer and there are non-trace faults. When all of these conditions are met, decision path 542 is taken to processing block 548 where the subroutine CANCEL BRANCH is executed.

Figure 7:
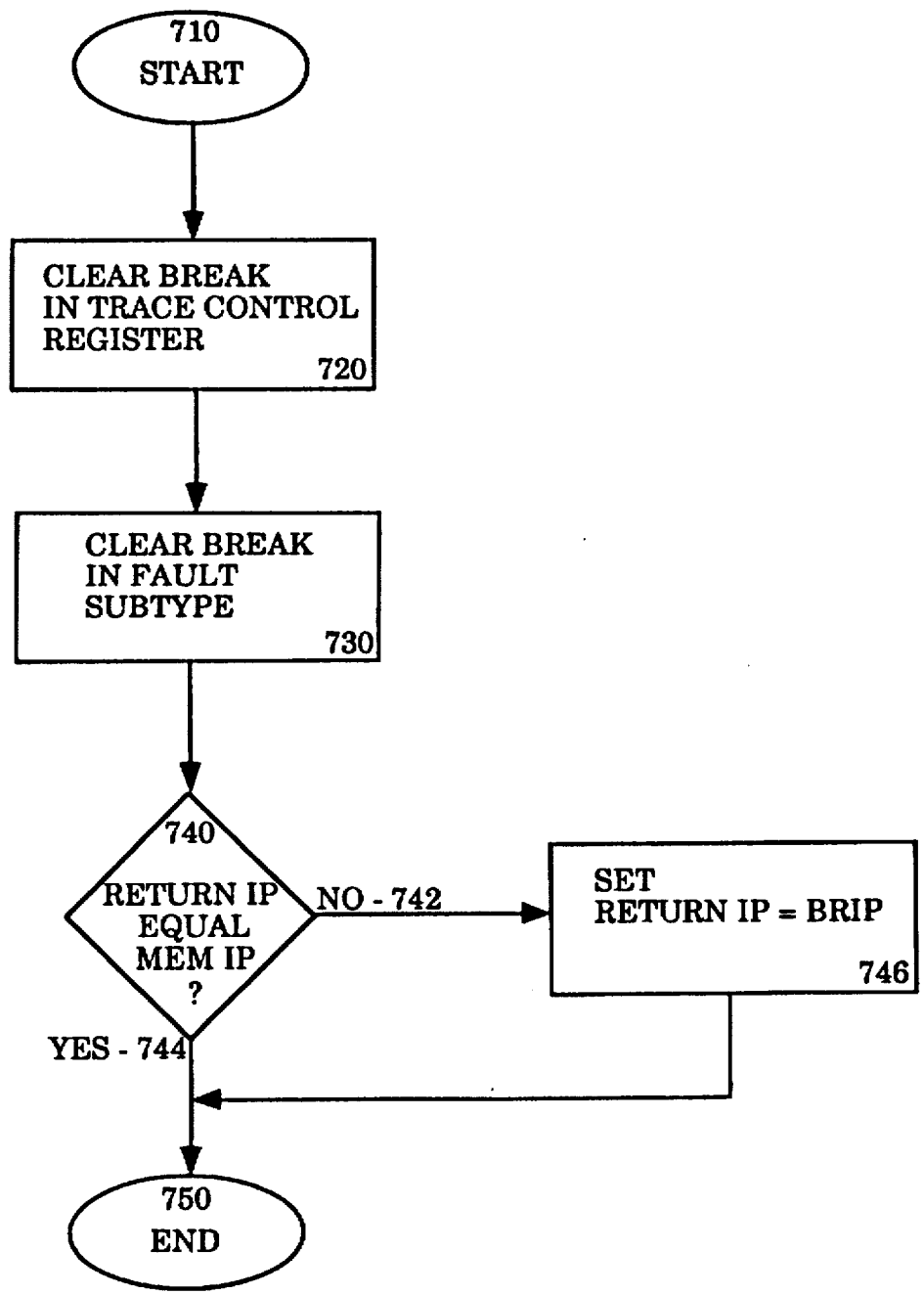
FIG. 7 illustrates a flow chart of a cancel branch routine that is used by the serialization algorithm of FIG. 5.

Referring briefly to FIG. 7, a flow chart for subroutine CANCEL BRANCH is illustrated. Processing in CANCEL BRANCH 700 begins at start bubble 710 and proceeds to process block 720 where the break in the trace control register is cleared for the branch operation. Then, the break in the fault subtype is also cleared in process block 730 and a test is made in decision block 740 to determine whether the return instruction pointer is equal to the memory instruction pointer. If the return instruction pointer is equal to the memory instruction pointer, then the branch will have been effectively canceled. Thus the branch operation will occur after the memory instruction, so decision path 744 is taken to terminal bubble 750. If, on the other hand, the return instruction pointer is not equal to the memory instruction pointer then decision path 742 will be taken to process block 746 where the return instruction pointer is set to be that of the branch instruction pointer. This will cause the branch instruction to be re-executed.

Referring again to decision block 540 of FIG. 5, if there is no need to cancel the branch operation, then decision path 544 is taken to process block 546 where the faulting instruction pointer is set to be that of the branch instruction pointer.

Referring again to decision block 530 of FIG. 5, if it is not the case that there is a trace only on the branch instruction, then decision 534 is taken to decision block 550 where a test is made to determine whether an exclusive trace event is occurring.

If an exclusive trace event is occurring, then decision path 544 is taken to process block 560 where the fault instruction pointer is set to the XLT FLT IP value, that is, the faulting instruction pointer for the exclusive trace event. If, on the other hand it is found in decision block 550 that a non-exclusive trace event is occurring, then decision path 552 is taken to process block 556 where the subroutine INSTRUCTION BREAK POINT is executed.

Figure 8:
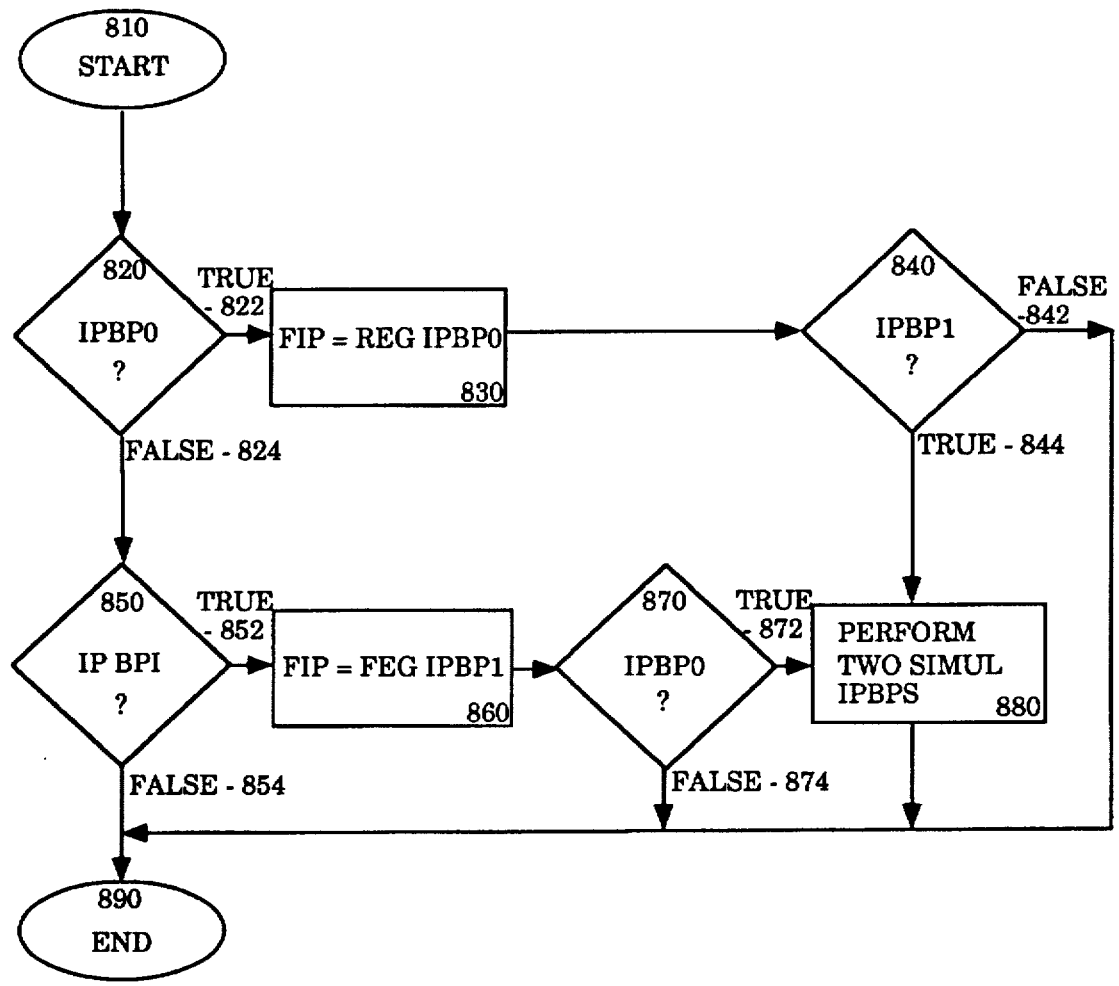
FIG. 8 illustrates a flow chart of an instruction break point subroutine used by the serialization algorithm of FIG. 5.

Referring to FIG. 8, a flow chart of the routine INSTRUCTION BREAK POINT is illustrated. INSTRUCTION BREAK POINT 800 handles instruction trace faults that are present in a multiple instruction word issue. Instruction break points can occur on any of the up to three instruction words issued. The trace fault logic records instruction break point instruction pointers in two control registers (i.e. IP break point registers 0 and 1). Therefore, the fault instruction pointer for instruction pointer break points can be determined by accessing the appropriate break point register. Thus, for example if an IP BRK PT 0 (IPBP0) trace occurred, the fault instruction pointer is that found in instruction pointer break point register IPBP0. This is complicated, however, if an IP BRK PT 1 trace (IPBP1) also occurs. In the case where both IP break points are reported, the routine "TWO SIMUL IPBPS" of FIG. 9 will be called to sort things out. Thus, in FIG. 8, the routine INSTRUCTION BREAK POINT 800 begins at start bubble 810 and proceeds to process block 820 where a test is made to see whether IPBP0 has been set. If IPBP0 is true, then decision path 822 is taken to process block 830 where the faulting instruction pointer is set to be that of the instruction pointer stored in register IPBP0. Then, in decision block 840, a test is made to determine whether IPBP1 is also true. If IPBP1 is found to be false in decision block 840, then there is only one instruction break point and the routine will take decision path 842 to terminal bubble 890 where it ends.

If, on the other hand IPBP1 is found to be true in decision block 840, then decision path 844 is taken to process block 880 where the subroutine TWO SIMUL IPBPS is performed.

Figure 9:
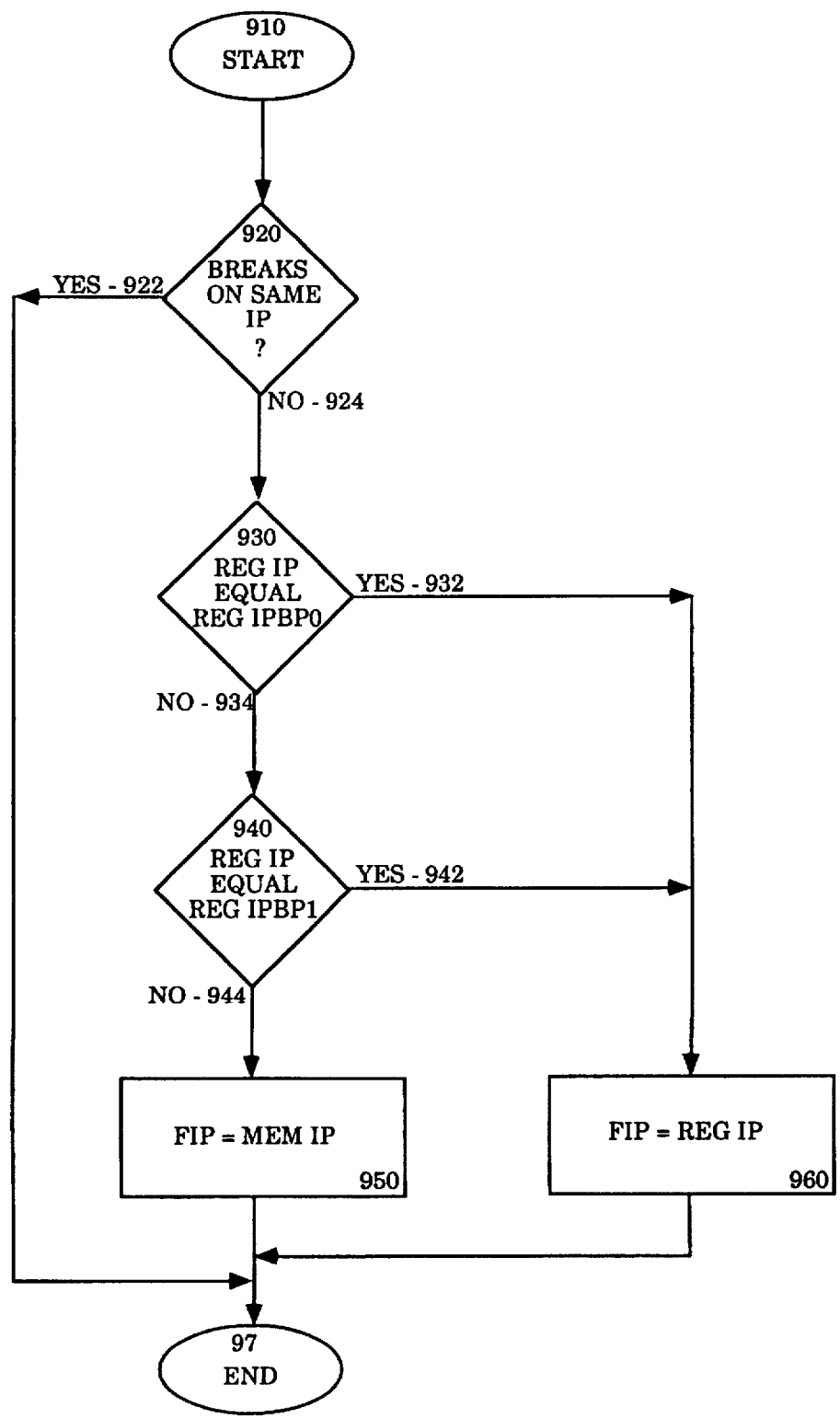
FIG. 9 illustrates a flow chart for the case where there are two simultaneous instruction pointer break points encountered during the serialization algorithm of FIG. 5.

Referring to FIG. 9, a flow chart for the subroutine TWO SIMUL IPPBPS is depicted. This subroutine is only called when it is the case that both instruction pointer break points IPBP0 and IPBP1 have been reported. Processing begins at start bubble 910 and proceeds to decision block 920 where a test is made to determine whether the instruction pointer breaks reported are on the same instruction pointer. If this is the case, then decision path 922 is taken to terminal bubble 970 where the subroutine ends.

If, on the other hand, it is determined in decision block 920 that the breaks reported do not occur on the same instruction pointer, then, from the first and second rules, it follows that one of four cases must have occurred. If a two instruction set has been issued, the issue template must be that of a register operation and a branch operation or that of a memory operation and a branch operation. In either case, an instruction point break point will have been set on both instructions. If a three instruction set has been issued (that is a register, memory and branch operation set), then one trace must be on the branch operation and the other trace must be on either the register or the memory operation. Looking at these four combinations, it can be seen that, if neither of the instruction pointer break points is on the register instruction, then the faulting instruction pointer must be that of the memory operation instruction pointer. Otherwise, the faulting instruction pointer is that of the register operation instruction pointer.

In process block 930, a test is made to determine whether the register instruction pointer is equal to the instruction pointer stored in the IPBP0 register. If it is, then decision branch 932 is taken to process block 960 where the fault instruction pointer is set to be that of the register operation instruction pointer.

If, on the other hand, the register operation instruction pointer is not equal to the instruction pointer for break point 0, then decision path 934 is taken to decision block 940 where a test is made to determine whether the register instruction pointer is equal to the instruction pointer stored for break point 1. If that is the case, then decision path 942 is taken to process block 960 where the fault instruction pointer is set to be that of the register operation instruction pointer. If that is not the case, then decision path 944 is taken to process block 950 where the fault instruction pointer is set to be that of the memory operation instruction pointer. In either case, processing continues to terminal bubble 970 where the subroutine terminates.

Referring again to FIG. 8 and decision block 850, a test is made to determine whether instruction pointer break point 1 has occurred. If it has not, then subroutine INSTRUCTION BREAK POINT 800 ends at terminal bubble 890.

If, on the other hand, instruction pointer break point 1 has been set, then decision path 852 is taken to process block 860 where the fault instruction pointer is set to be that of the instruction pointer for break point 1. Then, in decision block 870, a test is made to determine whether the instruction pointer for break point 0 has also been set. If it has not, then decision path 874 is taken to terminal bubble 890. If, on the other hand, it has been set, then there are two simultaneous IP break points and decision path 872 is taken to process block 880 where the subroutine TWO SIMUL IPBPS is called before the INSTRUCTION BREAK POINT subroutine terminates in terminal bubble 890.

Referring again to process block 570 of FIG. 5, regardless of whether an exclusive trace event occurred or not, a check is made in process block 570 to determine whether a break point has been set on a branch instruction pointer. For the case where there was not an exclusive trace event, the branch instruction pointer is cleared off because only the first instruction pointer break point (i.e. that on either the register or memory operation) is to be reported at this time.

In the case of an exclusive trace event, a check is made to see if there is a break point on the branch instruction pointer. This is because, in this embodiment, a branch operation can execute in parallel with a micro flowed instruction during the branch operation translation cycle. Thus, suppose there were two macro instructions where the first was a micro flowed instruction such as a call, and the second was a branch instruction with a break point set on the branch. If these two operations are fetched and sent to the core so that the branch is seen "early", the branch will execute during the translate cycle while the register and memory instructions are being executed. If this branch causes a trace fault, a call trace event and a branch trace event will occur. Thus, it is possible to have a spurious branch operation trace that must be canceled. Canceling the branch means clearing the break bit in the trace controls and the subtype. One must also set the fault instruction pointer to be that of the branch operation, unless the fault instruction pointer has already been set to a preceding memory operation.

Figure 10:
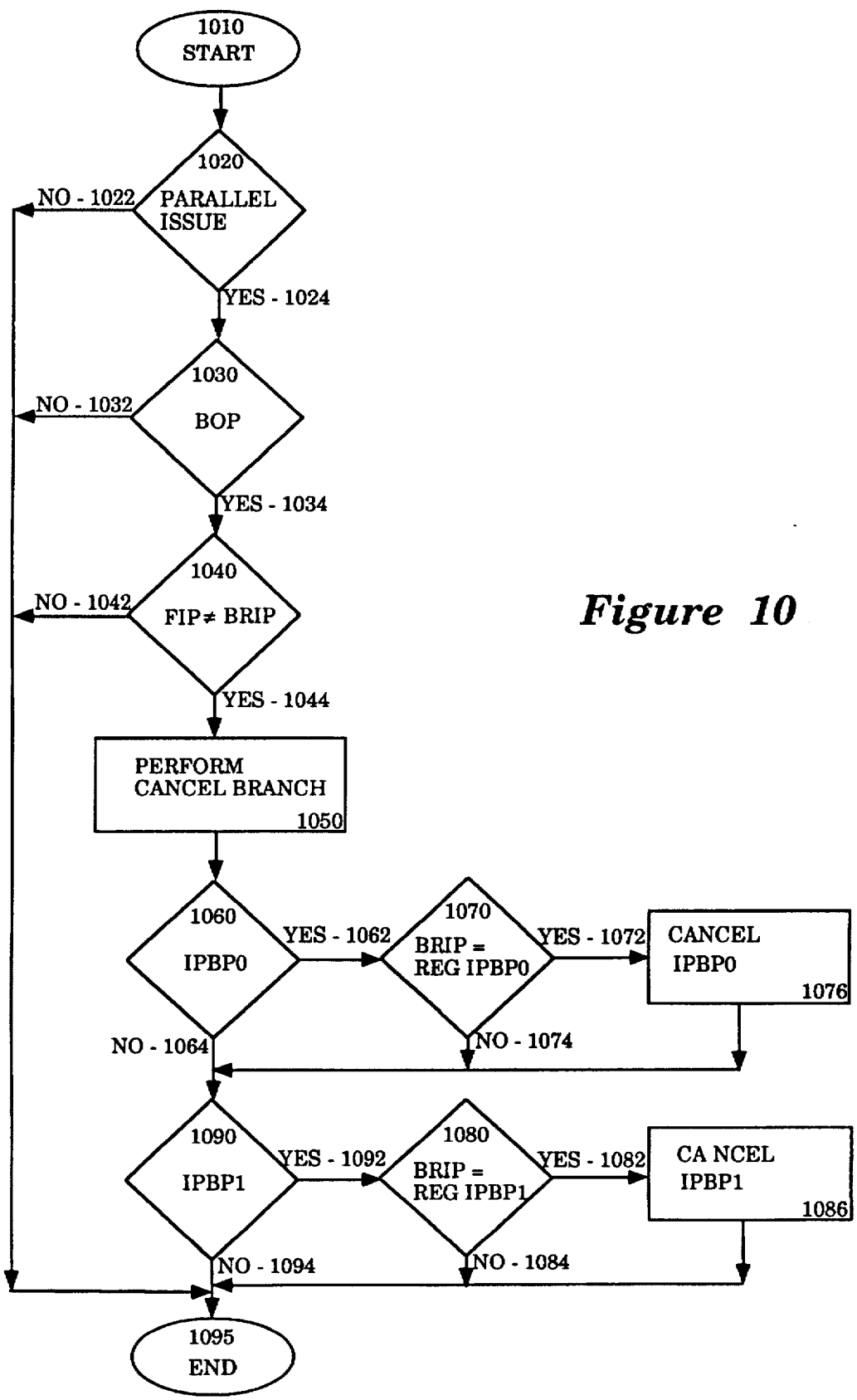
FIG. 10 illustrates a flow chart of an algorithm that checks if a break point has occurred on a branch instruction pointer during execution of the serialization algorithm of FIG. 5.

Referring now to FIG. 10, a flow chart for subroutine CHECK IF BRKPT ON BRANCH IP 1000 is illustrated. Processing begins at start bubble 1010 where a series of tests are performed in decision blocks 1020, 1030 and 1040 to find the conditions that cause the spurious branch operation break to be reported. This spurious branch break point will only occur when the processor is operating in parallel issue mode, a branch operation is included in the instruction group and the fault instruction pointer is not equal to the branch instruction pointer. Unless all of these conditions exist, then processing terminates immediately at end bubble 1095.

If, on the other hand, all of the conditions exist, then a spurious branch operation exists and decision path 1044 is taken from decision block 1040 to process block 1050 where the subroutine CANCEL BRANCH is performed to cancel the spurious branch operation.

It may be the case that the branch operation has been reported as being IP break point 0. If that is the case, then IP break point 0 must be canceled. Thus, a test is made in decision block 1060 to determine whether instruction point break point 0 has been set. If it has, then decision path 1062 is taken to decision block 1070 where a test is made to determine whether the branch instruction pointer is the instruction pointer stored in the register for instruction pointer break point 0. If that is the case, then decision branch 1072 is taken to process block 1076 where the instruction pointer break point 0 is canceled.

A similar test is made in decision block 1090 to see whether instruction pointer break point 1 has been set. If it has, and the register containing the instruction pointer for break point 1 contains the branch instruction pointer, then IP break point 1 is canceled in process block 1096.

Referring again to FIG. 5, a test is made in decision block 580 to determine whether a data break point has been set. If no data break point has been set, then decision path 584 is taken to process block 590 where the fault is staged into an SRAM staging area (process block 590) before returning (terminal bubble 595).

If, on the other hand, it is found in decision block 580 that a data break point has also occurred, decision path 582 is taken to process block 586 where the DATA BREAK POINT subroutine is performed.

Figure 11:
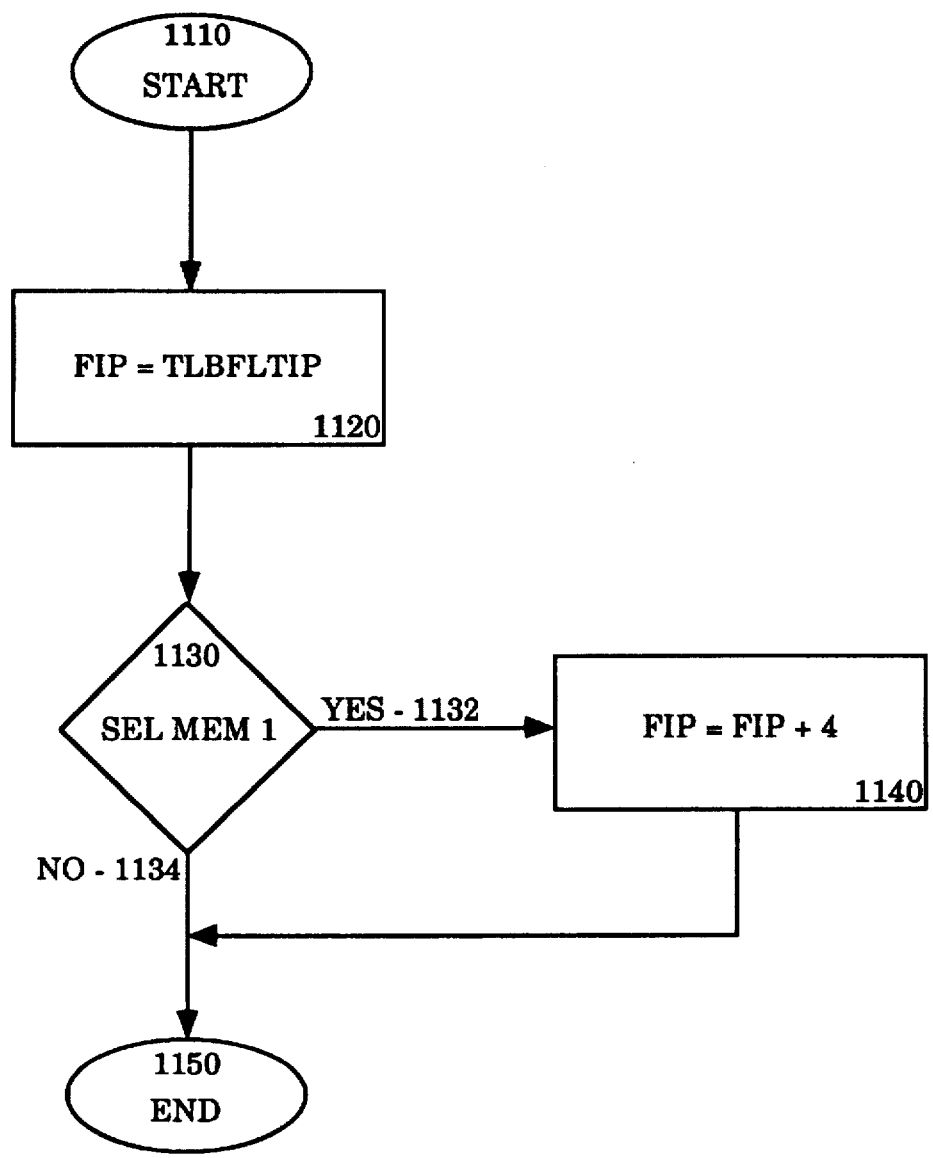
FIG. 11 illustrates a flow chart of logic for the case where a data break point occurs during the serialization algorithm of FIG. 5.

Referring now to FIG. 11, a flow chart for the subroutine DATA BREAK POINT 1100 is illustrated. Data break points are handled specially. This is because data break points are signaled later than other break points and can therefore occur simultaneously with other trace faults of succeeding instructions. This is a problem because, in this embodiment, only a single fault instruction pointer is reported in a trace fault. Therefore, for example, a memory instruction that triggers a data break point could execute, followed by register, memory or break point instructions that also generate a trace fault (for example an instruction pointer break point). This is handled by having the data break point instruction pointer be the reported instruction pointer if a data break point occurs together with other trace faults. The occurrence of the other trace events will still be reported by the trace controls register, and the fault word subtype, but their instruction pointer will not be. Thus, if two data break points occur, one on the first memory operation and another on a second memory operation issued during execution of the first, then the faulting IP will contain the instruction pointer of the second data break point, thereby losing the first data break point. In this way, the machine will break at the correct spot, but because it can only report a single faulting instruction point, it will report the latter.

In FIG. 11, subroutine DATA BREAK POINT 1110 begins at start bubble 1110 and proceeds to process block 1120 where the faulting instruction pointer is set to the TLB FLT IP value. A test is then performed in decision block 1130 to see if SEL MEM 1 has been set to indicate an instruction set containing a register operation followed by a memory operation. If SEL MEM 1 has been set, then the faulting instruction pointer is incremented by four in process block 1140 before the routine ends.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A method for providing precise trace faults for testing and debugging a superscalar processor, the method comprising the steps of:

grouping instructions into a cluster of instructions to be executed simultaneously by the superscalar processor;

decoding each instruction of the cluster; determining faulting instructions, if any, of the cluster of instructions, the faulting instructions being instructions having a break point for testing and debugging;

if no faulting instructions were found, simultaneously executing each instruction in the cluster;

if at least one faulting instruction was found,
  determining a break faulting instruction, the break faulting instruction being a first faulting instruction in the cluster of instructions;
  simultaneously executing the break faulting instruction and each instruction of the cluster occurring prior to the break faulting instruction.

2. The method as set forth in claim 1 further comprising the steps of:

classifying instructions into instruction types; and grouping the instructions into the cluster of instructions according to a predetermined set of grouping rules.

3. The method as set forth in claim 2 wherein each instruction is classified as:

a REG instruction if the instruction involves register to register operations;

a MEM instruction if the instruction involves memory operations; and a BOP instruction if the instruction is a branch operation.

4. The method as set forth in claim 3 wherein the predetermined set of grouping rules require the cluster to be formed of at least one and no more than three instructions.

5. The method as set forth in claim 4 wherein each cluster can have at most one REG instruction, each cluster can have at most one MEM instruction and each cluster can have at most one BOP instruction.

6. The method as set forth in claim 5 wherein if a cluster is formed having a BOP instruction, the BOP instruction will be the last instruction in the consecutive sequence.

7. The method as set forth in claim 6 wherein if a cluster is formed having a REG instruction, the REG instruction will be the first instruction in the consecutive sequence.

8. A precise fault superscalar processor comprising:

execution means for executing instructions simultaneously;

grouping means for grouping instructions into a cluster of instructions to be executed simultaneously;

decoding means coupled to the grouping means, the decoding means for decoding each instruction of the cluster;

fault detection means coupled to the decoding means and the execution means, the fault detection means for detecting faulting instructions, if any, of the cluster, the faulting instructions being instructions having a break point for testing and debugging;

scoreboard means coupled to the fault detection means and the execution means, the scoreboard means for determining a break faulting instruction, the break faulting instruction being a first faulting instruction in the consecutive sequence of the cluster instructions, if no faulting instructions were found, the execution means simultaneously executing each instruction in the cluster, if at least one faulting instruction was found, the execution means simultaneously executing the break faulting instruction and each instruction of the cluster in the consecutive instruction sequence prior to the break faulting instruction.

9. The processor as set forth in claim 8 further comprising:

a classifying means coupled to the grouping means, the classifying means for classifying instructions into instruction types; and the grouping means grouping instructions into the cluster of instructions according to predetermined grouping rules based upon the instruction types.

10. The processor as set forth in claim 9 wherein each instruction is classified as:

a REG instruction if the instruction involves register to register operations;

a MEM instruction if the instruction involves memory operations; and a BOP instruction if the instruction is a branch operation.

11. The processor as set forth in claim 10 wherein the predetermined set of grouping rules require the cluster to be formed of at least one and no more than three instructions.

12. The processor as set forth in claim 11 wherein each cluster can have at most one REG instruction, each cluster can have at most one MEM instruction and each cluster can have at most one BOP instruction.

13. The processor as set forth in claim 12 wherein if a cluster is formed having a BOP instruction, the BOP instruction must be the last instruction in the consecutive sequence.

14. The processor as set forth in claim 13 wherein if a cluster is formed having a REG instruction, the REG instruction must be the first instruction in the consecutive sequence.

15. A precise fault superscalar processor comprising:

an executor for executing instructions simultaneously;

a grouper for grouping instructions into a cluster of instructions to be executed simultaneously;

a fault detector for detecting faulting instructions, if any, of the cluster, the faulting instructions being instructions having a break point for testing and debugging; and a scoreboard mechanism coupled to the fault detector and the executor, the scoreboard mechanism for determining a break faulting instruction if at least one faulting instruction was found, the break faulting instruction being a first faulting instruction in the consecutive sequence of the cluster instructions, if no faulting instructions were found, the executor simultaneously executing each instruction in the cluster, if at least one faulting instruction was found, the executor simultaneously executing the break faulting instruction and each instruction of the cluster in the consecutive instruction sequence prior to the break faulting instruction.

16. The processor as set forth in claim 15 further comprising:

a classifier coupled to the grouper, the classifier for classifying instructions into instruction types; and the grouper grouping the instructions into the clusters based on predetermined grouping rules based upon the instruction types.

17. The processor as set forth in claim 16 wherein each instruction is classified as:

a REG instruction if the instruction involves register to register operations;

a MEM instruction if the instruction involves memory operations; and a BOP instruction if the instruction is a branch operation.

18. The processor as set forth in claim 17 wherein the predetermined set of grouping rules require the cluster to be formed of at least one and no more than three instructions.

19. The processor as set forth in claim 18 wherein no cluster can have more than one REG instruction, no cluster can have more than one MEM instruction and no cluster can have more than one BOP instruction.

20. The processor as set forth in claim 19 wherein if a cluster is formed having a BOP instruction, the BOP instruction must be the last instruction in the consecutive sequence.

21. The processor as set forth in claim 20 wherein if a cluster is formed having a REG instruction, the REG instruction must be the first instruction in the consecutive sequence.

22. A method for invoking precise trace faults in a superscalar processor, the method comprising the steps of:

accessing the superscalar processor with a source external to the superscalar processor, the source for testing and debugging the superscalar processor, and setting at least one trace fault;

grouping instructions into a cluster of instructions to be executed simultaneously by the superscalar processor;

decoding each instruction of the cluster;

determining faulting instructions, if any, of the cluster, the faulting instructions being instructions having a break point for testing and debugging;

if no faulting instructions were found, simultaneously executing each instruction in the cluster;

if at least one faulting instruction was found,
  i) determining a break faulting instruction, the break faulting instruction being a first faulting instruction of the cluster of instructions;
  ii) simultaneously executing the break faulting instruction and each instruction of the cluster prior to the break faulting instruction and then notifying the external source that the break faulting instruction has executed.

23. The method as set forth in claim 22 further further comprising the steps of:

classifying instructions into instruction types; and the step of grouping the instructions comprising the step of grouping the instructions based on predetermined grouping rules based on the instruction types.

24. The method as set forth in claim 23 wherein each instruction is classified as:

a REG instruction if the instruction involves register to register operations;

a MEM instruction if the instruction involves memory operations; and a BOP instruction if the instruction is a branch operation.

25. The method as set forth in claim 24 wherein the predetermined set of grouping rules require the cluster to be formed of at least one and no more than three instructions.

26. The method as set forth in claim 25 wherein no cluster can have more than one REG instruction, no cluster can have more than one MEM instruction and no cluster can have more than one BOP instruction.

27. The method as set forth in claim 26 wherein if a cluster is formed having a BOP instruction, the BOP instruction must be the last instruction in the consecutive sequence.

28. The method as set forth in claim 27 wherein if a cluster is formed having a REG instruction, the REG instruction must be the first instruction in the consecutive sequence.

29. The method as set forth in claim 22 wherein the external source is a host system.

30. The method as set forth in claim 22 wherein the external source is a software debugger.

* * * * *

UNITED STATES PATENT AND TRADEMARK OFFICE
CERTIFICATE OF CORRECTION

PATENT NO. : 5,752,013
DATED : May 12, 1998
INVENTOR(S) : Christensen et al.

It is certified that error appears in the above-identified patent and that said Letters Patent is hereby corrected as shown below:

In column 2 at line 30 delete "duster" and insert --cluster--

Signed and Sealed this

Eighth Day of September, 1998

Attest:

BRUCE LEHMAN

Attesting Officer     Commissioner of Patents and Trademarks